(12) United States Patent
Pandolfi et al.

(10) Patent No.: US 6,504,713 B1
(45) Date of Patent: Jan. 7, 2003

(54) ULTRA-RUGGED, HIGH-PERFORMANCE COMPUTER SYSTEM

(75) Inventors: Richard Pandolfi, Smithtown; Joseph Edman, Oakdale, both of NY (US)

(73) Assignee: IV Phoenix Group, Inc., Hauppauge, NY (US)

( * ) Notice: Subject to any disclaimer, the term of this patent is extended or adjusted under 35 U.S.C. 154(b) by 431 days.

(21) Appl. No.: 09/010,995

(22) Filed: Jan. 22, 1998

(51) Int. Cl.[7] .......................... H05K 7/20; H05K 7/00; H05K 5/02
(52) U.S. Cl. ................... 361/695; 361/694; 361/681; 361/687; 345/87
(58) Field of Search .................. 361/687, 681–683, 361/688–690, 694, 695; 345/87, 903; 248/917; 40/530

(56) References Cited

U.S. PATENT DOCUMENTS

| | | | | |
|---|---|---|---|---|
| 1,955,899 A | * | 4/1934 | Zworykin | 313/36 |
| 4,405,949 A | * | 9/1983 | Hockenbrock et al. | 358/237 |
| 4,529,905 A | * | 7/1985 | Ohkoshi et al. | 313/35 |
| 4,734,613 A | * | 3/1988 | Gerritsen et al. | 313/36 |
| 5,633,660 A | * | 5/1997 | Hansen et al. | 345/173 |

FOREIGN PATENT DOCUMENTS

| | | | | |
|---|---|---|---|---|
| JP | 406202566 | * | 7/1994 | G09F/9/00 |
| JP | 410319379 | * | 12/1998 | G02F/1/1333 |

* cited by examiner

Primary Examiner—Anatoly Vortman
(74) Attorney, Agent, or Firm—Venable; John P. Shannon

(57) ABSTRACT

A display module includes a sealed, heat conductive housing, a display screen secured to the housing by spaced, resilient mounting members, a touch responsive screen separated from the display screen by a narrow air gap, an airtight seal between a peripheral lip of the housing and the touch responsive screen, and a fan in the housing to circulate a fluid through the gap.

5 Claims, 4 Drawing Sheets

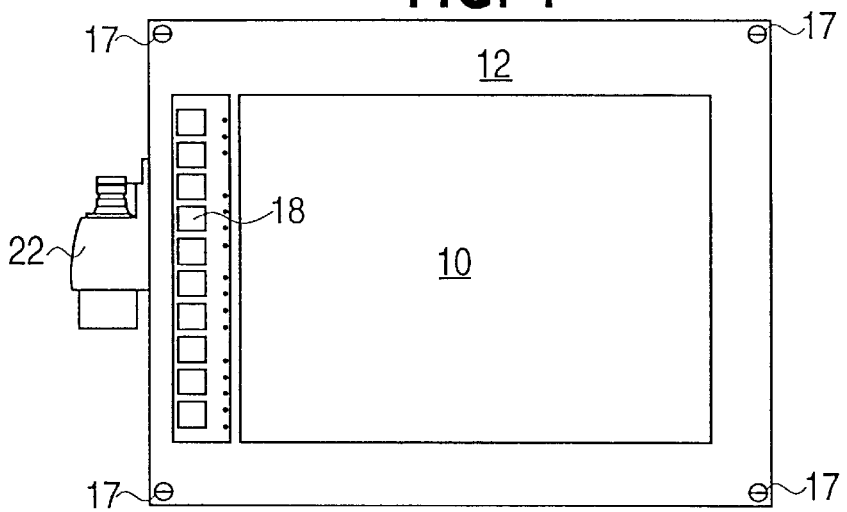
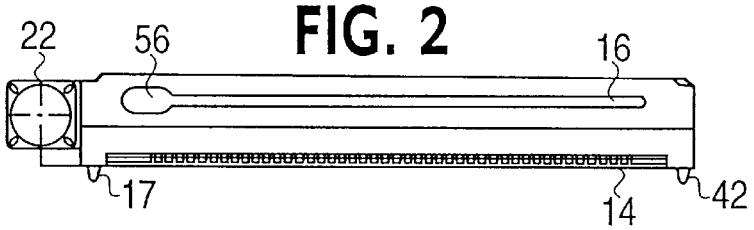
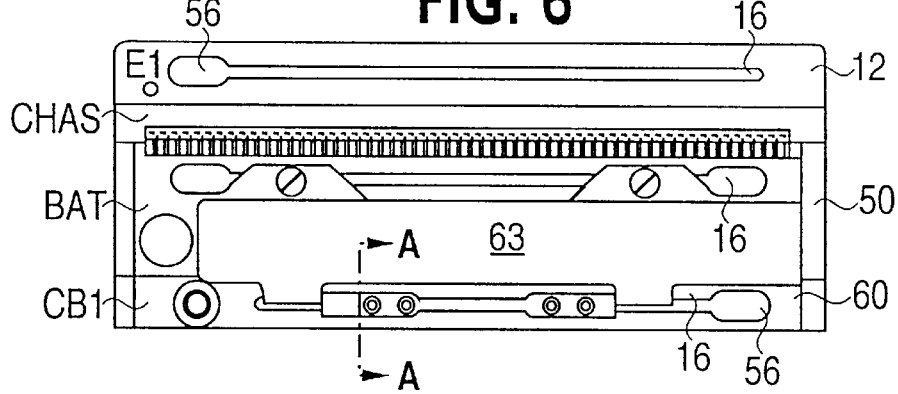
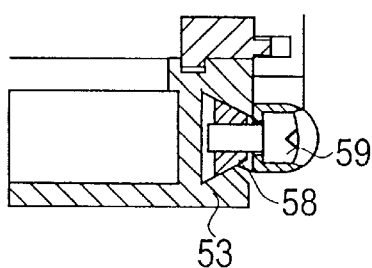

ULTRA-RUGGED, HIGH-PERFORMANCE COMPUTER SYSTEM

BACKGROUND OF THE INVENTION

1. Field of the Invention

This invention relates to an ultra-rugged, high-performance, computer system comprised of modules that can be joined together into a unitary stack or mounted separately apart and, more particularly, to such a system with a high intensity display that can be read in direct sunlight.

2. Description of the Prior Art

In many severe operating environments, there is a need for a rugged, compact, but powerful computer system with a display that it can be viewed in direct sunlight. Oil rig platforms, wheeled and tracked military vehicles, ships, and aircraft are just some examples of these environments. It will be appreciated that in many of these environments, it is highly desirable to have the utmost flexibility and convenience in securing the system to an external structure. At the same time heat dissipation from a compact, rugged, package is a problem for a high performance system that includes a display with high luminous intensity.

SUMMARY OF THE INVENTION

An object of this invention is the provision of a rugged computer system comprised of modules that can be joined together into a single integral package or mounted separately, in different orientations.

A further object of the invention is the provision of a sealed system with internal convection cooling.

A further object of the invention is the provision of a rugged system with a touch sensitive display that can be viewed in direct sunlight.

Briefly, this invention contemplates the provision of a computer system comprised of modules; a display module, and a processor/power supply module, which in a preferred embodiment are sealed, and may be joined together as a single unit, or mounted separately by means of quadrilateral mounting rails that allow each module to be mounted in any one of four different orientations. The display module has a luminous intensity sufficient to allow it to be read in direct sunlight and the resultant heat is dissipated by air circulation within the module, including circulation across the face of the display.

BRIEF DESCRIPTION OF THE DRAWINGS

The foregoing and other objects, aspects and advantages will be better understood from the following detailed description of a preferred embodiment of the invention, in which:

FIG. 1 is a front view of one example of a display module in accordance with the teachings of this invention.

FIG. 2 is a bottom side view of the display module shown in FIG. 1.

FIG. 6 is a side view of the modules stacked to form a single physical unit.

FIG. 7 is a sectional view along the line A—A in FIG. 6.

DETAILED DESCRIPTION OF A PREFERRED EMBODIMENT

Figure 3:
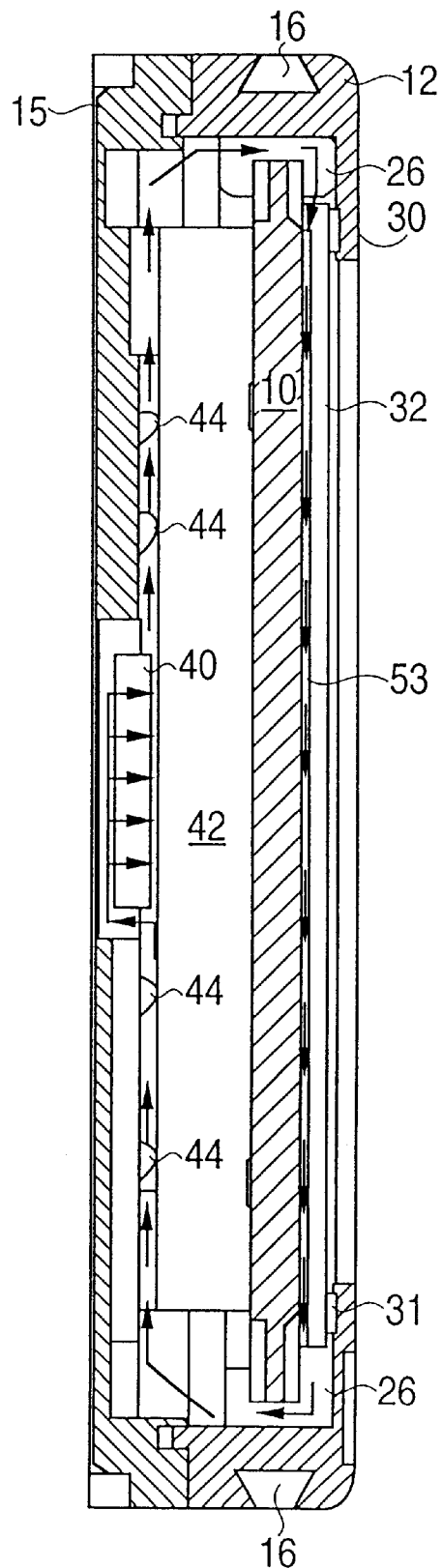
FIG. 3 is a sectional view of the display module showing details of its construction.

Refering now to FIGS. 1, 2, 3 and 4, the display module has a flat panel display screen 10, which is shock mounted in a rugged, two piece metal housing comprised of a front piece 12 and a rear piece 15. The housing has cooling fins 14 (not shown in FIG. 3) extending from the rear piece 15, opposite the display surface. There is a mounting bar 16 along each side (i.e. top, bottom, right and left) of the housing. This mounting bar 16 allows the display to be attached, separately from the other system components. This universal mounting capability can be used to attach the unit to a platform member and since there is a mounting bar on each side the mounted display can be orientated as desired. Four spring loaded, captive screws 17 are used to secure the display module to the processor module when the modules are stacked together.

The housing includes a key pad assembly 18 comprised, in this example, of ten key switches aligned in a vertical row with respect to the display screen 10. This assembley serves to provide function inputs to the system.

A display input/output connector 22 is attached to one side of the housing 12. This input/output connector 22 can mate blindly with a connector on the processor module when the modules are stacked together or can be connected to the processor module by a variable length cable when the modules are mounted separately.

The display may be implemented in any of a number of different technologies such as, for example, Liquid Crystal Display (LCD), Electro-Luminescent (E/L) or plasma display technology. A "U" shaped display screen shock and vibration damper 26 holds a glass display panel 10 against a circumferential lip 30 on the front piece 12 of the housing. The shock and vibration damper 26 is made of a highly-damped, rubber like material such as that sold under the trademark Sorbothane and available from Sorbothane, Inc. A number of discrete, resilient stand-offs 31 mount a touch screen panel 32 in front of the display panel 10, forming an air gap 53 between the front surface of the display panel and the rear surface of the touch screen panel 32 through which air can be circulated. Preferably, an Electro Magnetic Interference (EMI) mesh is secured to the back side of the touch screen panel 32, for example with a conductive adhesive such as a silver or copper impregnated epoxy. The EMI mesh is electrically connected to the housing 12 by means of a pliable conductive tape to provide a tight, highly conductive EMI seal.

The shock and vibration damper 26 is preferably segmented, rather than continuous, in order to provide a path for the flow of a circulating cooling fluid, such as air, to circulate through the air gap 53 driven by convection currents or by one or more fans 40 located in the display housing and which may be, but need not be, vented to the outside atmosphere. FIG. 3 shows the cooling fluid flow pattern in a sealed display module with the internal fan 40 circulating the air in what is commonly referred to in the art as a swash action. The air is driven by the fan in a circular flow pattern so as to increase the laminar flow of air between the front surface of the display panel 28 and the touch responsive screen 32. Forcing air through this gap between the front surface of the display panel and the rear surface of the touch sensitive panel substantially reduces the surface temperature of the display face when subjected to solar radiation as well as high ambient temperature conditions. In addition, it should be noted, the circulating fluid can serve also to maintain a uniform temperature across the face of the display module and to warm the surface of the display module by circulating heat generated by the display electronics or illumination lamps or special heating elements to the surface display unit. This allows the unit to function reliablity in cold ambient temperatures (e.g. minus 32 degrees C).

Figure 4:
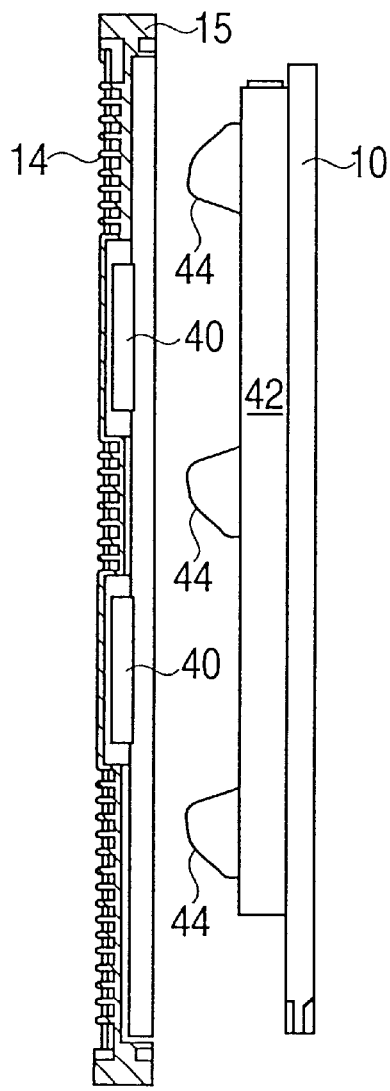
FIG. 4 is a disassembled view of the display module similar to the view shown in FIG. 3, but with some parts omitted, and other parts shown in added detail.

Referring now to FIG. 4 in addition to the previous figures, a preferred embodiment of the invention employs a color active matrix display. In order to allow this display to be readable in direct sunlight, ultrathin fluouresent bulbs are mounted in a heat conducting assembly 42, e.g., an aluminum assembly. Flexible heat conducting springs 44 conduct heat from the assembly 42 to the rear housing module 15 and its fins 14 on rear surface of the housing.

Figure 5:
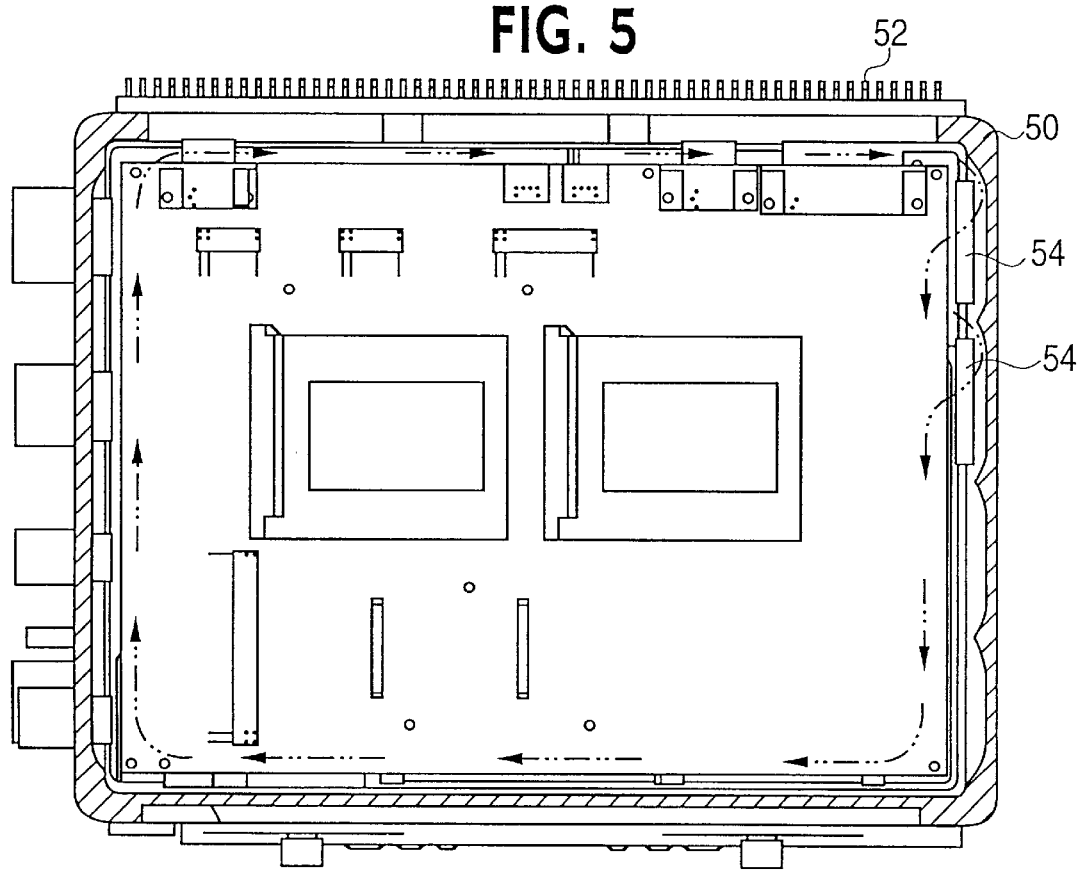
FIG. 5 is a sectional view of a processor module.

Referring now to FIG. 5, the CPU module has a heat conductive metal housing 50 whose overall peripheral shape and dimensions are similar to that of the display housing. The CPU housing 50 has a universal mounting strip 16 on each side wall of the housing so that it can be mounted independently of the display module. The CPU housing 50 also has heat dissipating fins 52 on the side of the housing facing the rear of the display module housing when the display module and the CPU module are stacked together. A connector, disposed on one side of the housing 50, is adapted to be connected to the connector 22 on the display housing. Internal fans 54 circulate air through the CPU housing 50 and heat is conducted by the housing to the ambient atmosphere, particularly through the cooling fins 52.

Referring now to FIG. 6, it shows the modules stacked together, including a power supply module 60 attached to the CPU module 50.

FIG. 7 shows details of the universal mounting system which is provided, preferably, along all four edges of the display housing, and similarly on all four edges of the processor and power modules. The universal mounting system includes a "VI" shaped slot 55 in the mounting bar 16, with an enlarged opening 56 at one or both ends of the slot. To secure a module to a platform, a threaded wedge 58 is inserted into the slot 55 through the opening 56 and moved relative to the slot to a desired position along the slot. A screw 59 is used to secure the display to the platform.

As shown in FIG. 6, a plate 63 engages the mounting bar 16 in both the power supply module 60 and the CPU module 50 to join together these modules in the stack.

Figure 8A:
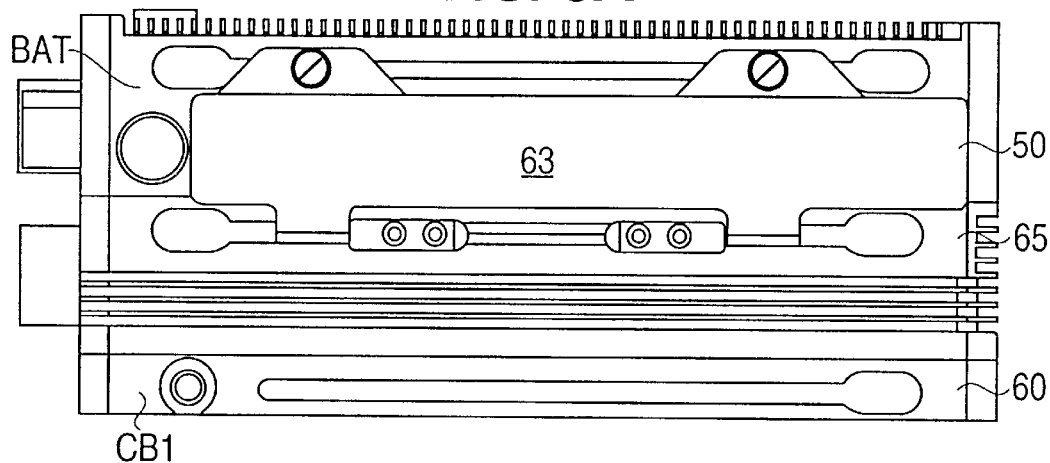
FIGS. 8A and 8B are respectively a side view and an end view of a power supply module and a CPU module with a belly band extention module interposed between them.
Figure 8B:
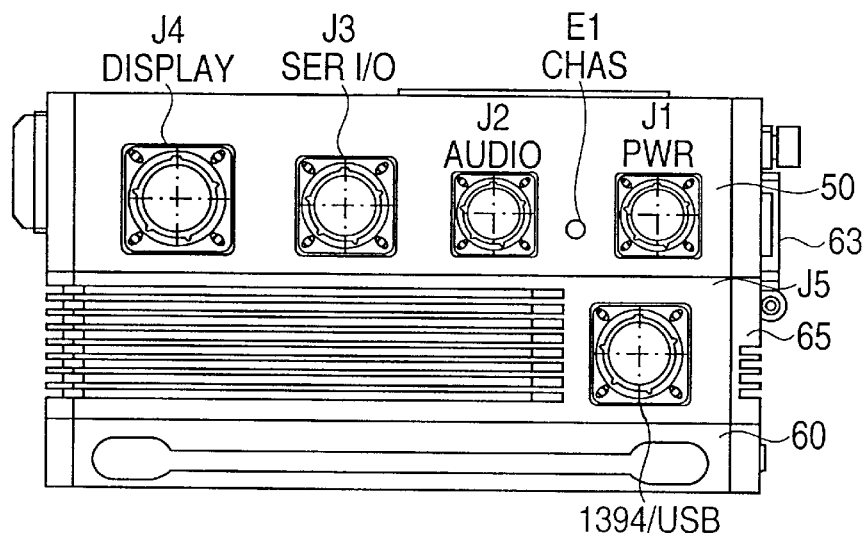

Referring now to FIGS. 8A and 8B, a belly band extension module 65 may be inserted between the power supply module 60 and the CPU module 50. The extension module 65 can house the circuitry and devices required for optional system features. For example, the module 65 can house P.C. cords, disk drives and tape drives and can be manufactured and stacked on a range of heights; for example, from one half inch to six inches in half inch increments.

While the invention has been described in terms of a single preferred embodiment, those skilled in the art will recognize that the invention can be practiced with modification within the spirit and scope of the appended claims.

Having thus described my invention, what I claim as new and desired to secure by letters patent is as follows:

1. A display module comprising in combination:
    an air tight, hermetically sealed, heat conductive housing having four side walls, a back wall, and a front opening with a peripheral lip;
    a flat panel display screen secured to said housing by means of a plurality of spaced apart, resilient mounting members;
    a touch responsive screen mounted in front of said flat panel display screen and separated from said flat panel display screen by a narrow air gap;
    a resilient, sealing material providing an air tight seal between the peripheral lip of said housing and said touch responsive screen;
    a fan mounted in said housing to circulate a fluid through said gap.
2. A display module as in claim 1 further including a heat conducting assembly for supporting lamps to back light said flat panel display screen.
3. A display module as in claim 2, further comprising flexible heat conducting springs extending from said heat conducting assembly to the heat conductive housing.
4. A display module as in claim 3, wherein said heat conducting springs contact one side of a wall of the heat conductive housing, and an opposite side of the wall has cooling fins.
5. A display module as in claim 2, wherein said heat conducting assembly is made of aluminum.

* * * * *